United States Patent [19]

Thomas

[11] 4,265,770

[45] May 5, 1981

[54] SEPARATION OF SUSPENDED SOLIDS FROM PHOSPHATE TAILINGS

[75] Inventor: James P. Thomas, Woodland, Calif.

[73] Assignee: Amstar Corporation, New York, N.Y.

[21] Appl. No.: 93,005

[22] Filed: Nov. 9, 1979

[51] Int. Cl.$^3$ .......................... B01D 21/01; C02F 1/56
[52] U.S. Cl. .................................... 210/715; 210/727; 210/907
[58] Field of Search ................... 210/20, 42 R, 46, 49, 210/51-54, 83, 84

[56] References Cited

U.S. PATENT DOCUMENTS

| | | |
|---|---|---|
| 3,350,302 | 10/1967 | Demeter et al. ....................... 210/46 |
| 3,523,889 | 8/1970 | Eis ............................................ 210/46 |
| 3,622,087 | 11/1971 | Oltmann ................................ 210/335 |
| 3,680,698 | 8/1972 | Liu et al. ................................. 210/46 |
| 3,763,041 | 10/1973 | Cook et al. ......................... 210/42 R |

*Primary Examiner*—Peter A. Hruskoci
*Attorney, Agent, or Firm*—Cooper, Dunham, Clark, Griffin & Moran

[57] ABSTRACT

A process for separating suspended clay and sand solids from the slimes of phosphate tailings is described. The suspended solids are rapidly agglomerated and a relatively dense sludge which settles to the bottom of the separation vessel is formed. The sludge may then be discharged into settling ponds for dewatering and compaction.

5 Claims, No Drawings

SEPARATION OF SUSPENDED SOLIDS FROM PHOSPHATE TAILINGS

BACKGROUND OF THE INVENTION

This invention relates to a process for separating suspended solids from the tailings fraction of phosphate ore.

Phosphate ore contains substantial amounts of impurities, largely clay and sand. In the usual treatment of the ore, the ore is first broken apart into small pieces and then separated into a concentrate and a waste or tailing. The tailing fraction contains extremely fine clay and sand particles. Because of their minute size, the particles, when carried in water, remain suspended in the water for relatively long periods of time. Such suspensions of tailings are known as slimes.

Disposal of the slimes of phosphate tailings presents a problem. At present, the slimes are discharged into large settling ponds where the extremely fine suspended solids eventually settle to the bottom of the pond. The process is slow and transforms large areas of potentially valuable lands into unsightly and dangerous lagoons. Obviously the problem of disposal would be greatly reduced if the slimes could be concentrated into a relatively dense sludge quickly and efficiently. Government regulations which require that phosphate waste tailings be returned to the open pit mines for reclamation of the land provide another impetus for a quick and efficient method of producing a relatively dense sludge. One means for preparing a dense sludge is through the use of mechanical thickeners.

In U.S. Pat. No. 3,622,087 a process is described for producing a relatively dense sludge of sand and clay from phosphate tailings through the use of thickeners. However, the process is complex and requires several thickening stages in order to produce a satisfactory sludge. For example, the solids concentration of the sludge is 5 to 6 percent after a first thickening, 12 to 14 percent after a second thickening, and about 22 percent following a third thickening stage. There remains a need for a method which produces a thickened sludge more efficiently.

SUMMARY OF THE INVENTION

By means of the present invention, a relatively dense sludge is produced from the slimes of phosphate tailings in a single thickening stage. The sludge produced by this process may comprise as much as 12% clay and 14% sand. The thickened sludge may then be discharged into pits for dewatering and compacting into clay and sand layers.

The relatively dense sludge is produced by treating the slimes of phosphate tailings in a series of steps which separates the extremely fine suspended solids from a clear supernatant liquid. In the first step, a settling aid or flocculating agent is added to the slimes to cause a partial agglomeration of the solid particles. In the next step, the slime is introduced into a settling zone of a separation vessel. The settling zone contains a previously formed slurry of liquids and solids with a higher concentration of agglomerated solids than is contained in the influent feed. The path of the influent feed is deflected radially and outwardly in order to increase the degree of contact between the solids in the influent feed and the agglomerated solids already present in the settling zone. Additional and rapid agglomeration results from the increased contact and the agglomerates quickly settle to the bottom of the vessel. In the last step of the process a relatively dense sludge is continuously withdrawn from the bottom of the settling zone at a rate which maintains the upper boundary of the settling zone substantially stationary.

In one embodiment, the invention is directed to a process for the separation of suspended clay solids from the slimes of phosphate tailings. In another embodiment, the invention is directed to a process for the separation of suspended clay and sand solids from the slimes of phosphate tailings.

A particularly satisfactory device for carrying out the invention herein described is the apparatus disclosed in U.S. Pat. No. 3,523,889.

DETAILED DESCRIPTION OF THE INVENTION

The process of the present invention is begun by introducing a settling aid or flocculating agent to the slimes of phosphate tailings which contain solid clay particles suspended in water. The slimes may also contain finely divided sand along with the suspended clay solids. It has been found that the percentage of clay recovered in the sludge is greater if the feed slime contains clay and sand in a 1:1 ratio by weight than if no sand is present in the feed slime. Thus, in one embodiment of the invention, finely divided sand is added to the slimes so that the feed slimes contain finely divided sand and clay particles in a 1:1 ratio by weight.

The settling aid or flocculating agent causes an initial, at least partial agglomeration of the suspended particles and a slurry is formed. Settling aids or flocculating are described in U.S. Pat. No. 3,523,889. The settling aids disclosed therein include the groups of polyelectrolytes, and, more specifically, the group of organic copolymers of acrylamide having molecular weights estimated at between two and three million. It should be understood that any settling aid or flocculating agent which causes agglomeration of phosphate tailings to a substantial degree can be used in the process. However, the group of anionic, high molecular weight polyacrylamide resins work best. Particular polyacrylamide resins of this type useful in carrying out the invention include a number of commercially available products. Betz 1420, available from Betz Manufacturing Corp., has been used successfully. Andco AR 101, manufactured by Andco, Inc., which is also an anionic polyacrylamide resin but has a lower molecular weight than Betz 1420, has also been used successfully.

Preferably, the settling aid is added continuously to the suspension in the feed line leading to the separation vessel. The settling aid should be added at a point in the feed line which insures adequate dispersion. It may be desirable to add the settling aid at more than one point along the feedline. The rate at which the settling aid is continuously added to the suspension should be metered so as to produce the most effective dosage. While the most effective dosage depends on a variety of factors, such as the type of settling aid, the rate at which the slurry is being fed into the separation vessel, etc., it has been found that dosages ranging from 5 to 30 parts per million of anionic polyelectrolyte work best.

In the next step of the process, the resulting slurry is introduced as influent feed into a separation vessel beneath the upper boundary of a settling zone contained therein. The settling zone is filled with a previously formed slurry having a higher concentration of agglomerated solids than is present in the influent feed. Preferably, the previously formed slurry is gently agitated by the influent feed as it is introduced into the midst of the settling zone. No additional agitation is required.

The path of the influent feed is then deflected radially and outwardly soon after it is introduced into the settling zone. This increases the degree of contact between the solid particles in the influent feed and the solid agglomerates already present in the settling zone. The effect of this intermixing is to cause additional agglomeration and coalescence of the solid particles in the influent feed into relatively large agglomerates which, because of their size, rapidly settle to the bottom of the vessel. A baffle or other arresting means positioned closely adjacent to the outlet of the influent feed line may be used to deflect the path of the influent feed.

In the next step of the process, a dense liquid solids slurry fraction or sludge is continuously removed from the separation vessel. This fraction is removed at a point near the bottom of the settling zone and at a rate which maintains the upper boundary of the settling zone substantially stationary.

The sludge removed from the separation vessel may then be discharged into a settling pond where agglomerates will compact without significant segregation of sand and clay particles.

The following examples are presented in further illustration of the process of this invention.

EXAMPLE I

As noted previously, the apparatus described in U.S. Pat. No. 3,523,889 has been successfully employed in the practice of this invention. In this apparatus, the influent feed is introduced into the settling zone through a standpipe located in the center of the settling zone. A mechanical rake connected to a drive or motor is used to move the agglomerated solids at the bottom of the settling zone for discharge therefrom. This movement of the agglomerated solids is effected with minimum or substantially no agitation of the settling zone per se. A baffle positioned closely adjacent to the outlet from the standpipe arrests the motion of the influent feed emerging from the standpipe and deflects its path radially and outwardly. The dense underflow is removed through a bottom outlet while a clarified overflow is removed simultaneously from near the top of the separation vessel.

Tests were conducted on a laboratory model of such a device having a diameter of 3.5 inches at its settling zone. Prior beaker tests had shown that anionic flocculants produced faster settling than nonionic and cationic flocculants. Betz 1420 and AR 101, were chosen as settling aids.

The results obtained when the laboratory model was operated at a feed rate of 0.9 g.p.m/sq. ft. on samples of phosphate tailings from which the sand had been removed are given in Table I.

TABLE I

Separation of Suspended Solids From Clay-Containing Tailings

| SETTLING AID | | CLARIFIER FEED | | UNDERFLOW | |
|---|---|---|---|---|---|
| Type | Add'n Level ppm | Clay Content % Susp. Solids | Feed Rate gpm/ft$^2$ | Volume % of Feed | % Susp. Solids |
| Betz 1420 | 10 | 4.7 | 0.9 | little or no solids sepn. | |
| Betz 1420 | 16 | 4.7 | 0.9 | 87 | 4.4 |
| Betz 1420 | 20 | 4.7 | 0.9 | 54 | 8.7 |
| Betz 1420 | 30 | 4.7 | 0.9 | 81 | 5.0 |
| Andco AR101 | 5 | 4.4 | 0.9 | 84 | 5.6 |
| Andco AR101 | 10 | 4.4 | 0.9 | 50 | 7.6 |

Little or no separation of suspended solids was obtained when using Betz 1420 settling aid at dosages of 10 and 16 ppm. After increasing the dosage of Betz 1420 to 20 ppm, the concentration of suspended solids in the underflow was nearly twice the solids content of the feed. A settling aid dosage of 30 ppm appeared to produce a clumpy sludge bed, and an underflow that contained slugs of liquid, which resulted in a low solids concentration in the underflow.

In a second series of tests on the same device, sand was added to the samples of clay-containing tailings in amounts that were estimated to give one part sand to one part clay by weight in the clarifier feed. This approximates the natural distribution of clay and sand in phosphate ore. The results obtained with feed rates near 0.8 g.p.m./sq. ft. are given in Table II.

TABLE II

Separation of Suspended Solids from Combined Sand and Clay Containing Tailings

| SETTLING AID | | CLARIFIER FEED Clay Content | | UNDERFLOW | UNDERFLOW | |
|---|---|---|---|---|---|---|
| | Addition Level ppm | % Susp. Solids (Sand Free Basis) | Rate gpm/ft$^2$ | % of Feed Volume | % Clay Content (Sand Free Basis) | % Sand |
| Betz 1420 | 20 | 4.4 | 0.7 | 41 | 11.4 | 14.6 |
| Betz 1420 | 30 | 4.4 | 0.8 | little or no separation of susp. solids | | |
| Andco AR101 | 10 | 4.4 | 0.8 | 43 | 11.3 | 3.5 |
| Andco AR101 | 20 | 4.4 | 0.9 | 28 | 12.0 | 8.3 |

Clarifier feed clay content, on a sand free basis, was 4.4%. The data in Table II show that the ratio of sand to clay in the underflow samples ranged from 0.3 to 1.5. During these tests, sand appeared to settle in the clarifier feed tubing, and at times settle in the feed container. The underflow, on a sand free basis, contained about 11.4% clay when using settling aid dosages of 20 ppm Betz 1420 or 10 ppm Andco AR101. An underflow of 12.0% clay, on a sand free basis, was obtained with an Andco AR101 addition level of 20 ppm. Although underflow clay contents in tests with Andco AR101 addition levels of 10 and 20 ppm were similar, increasing the flocculant dosage over this range appeared to decrease the underflow volume from 43% to 28% of the feed volume.

When operating at a feed rate of 2 g.p.m./ft.$^2$ and with AR101 dosage of 20 ppm, the underflow contained 8% clay, on a sand free basis. There was little or no separation of suspended solids while operating at 2 g.p.m./ft.² with Betz 1420 dosages of 20 and 30 ppm.

The clarifier overflow in all of these tests, with and without sand added to the feed, was visually clear. An overflow of 460 ppm suspended solids was obtained while operating on a mixture of sand and clay at a rate of 0.7 g.p.m./ft.². These solids appeared to be coagulated particles that were carried into the overflow by entrained air, which resulted from violent agitation in the feed container.

The two series of tests show that slimes containing only clay particles can readily be separated into a sludge of close to 9% suspended solids and a clear liquid when the feed rate of the slimes is approximately 1 g.p.m./sq. ft. When the slimes contain both sand and clay particles in a 1 to 1 ratio by weight, an underflow of over 11% clay, on a sand free basis, and a clear overflow are readily obtained.

EXAMPLE II

Field tests were run with a similar device having a diameter of 3 feet. A primary slime of phosphatic clays was fed to the unit at rates ranging from 0.4 g.p.m./sq. ft. to 2.6 g.p.m./sq. ft. with an average value of 1.2 g.p.m./sq. The unit consistently yielded an underflow containing 11–12% suspended solids over a broad range of operating conditions, provided that a minimum dosage 0.4 lbs./ton of flocculant was used. Considerable variation in underflow solids concentration at a given dosage of flocculant was evident, reflecting a dependence on other equipment operating conditions such as input solids content and flow rate, flocculant injection rate, flocculant type, rake speed, variation in sludge bed level, and equipment operator performance.

Field tests were then run on secondary slimes. Not only was the average solids content markedly greater, running from 14 to 16%, but the feed rate could be consistently maintained as high as 4.2 g.p.m./sq. ft.

Settlement and consolidation of the clay sludge were then studied. A slime containing 2 to 6% clay solids was processed in the 3 feet in diameter unit. Flocculant was added at the rate of 0.3 to 0.5 lbs./ton dry clay. The underflow from the unit was mixed with sand and then discharged into one of two pits.

The pits were 4' wide, 48' long and 8' deep. The long sides and one end were covered with corrugated tin. Thus, seepage of water could take place only through the bottom and uncovered end of the pits. The equivalent of 41.9 feet of a clay slurry having a solids content of 3.5% was placed in the first pit within one month without exceeding the pit depth of 8 feet. The equivalent of 34.5 feet of a 3.5% clay slurry was deposited in the second pit within a ten day period. This is a much higher rate of compaction than that achieved by conventional means. For example, by the method of forming alternating layers of clay and sand, three hundred days are required to consolidate 46.5 feet of a 3.5% clay slurry into 6 clay layers with a combined thickness of 3 feet at an average clay solids content of 40%.

EXAMPLE III

A pilot plant program was developed to test the process under field conditions on a unit 3 feet in diameter. Comparison studies were made on the thickening by this unit of raw slimes and slimes and sand feed mixed in a ratio of 1 to 1. The results of these investigations led to the following conclusions: the dosage of flocculant must be increased as the concentration of solids in the feed increases; the dosage of flocculant needed per ton of bone-dry slime is 12% less for the slime-sand mixture than for the slime alone; the slime-sand mixture yielded a more dense sludge than that produced by the slimes alone; the slime-sand flocculated mixture is homogeneous with no settling out of sand; the unit could be operated at rates as high as 3.7 g.p.m./sq. ft. as compared to 0.5 g.p.m./sq. ft. for conventional thickeners.

It will be seen from the above description that a highly effective method has been devised for producing a relatively dense sludge from the slimes of phosphate tailings. For example, by means of the present invention, sludges containing 12% clay and 14% sand are easily obtained. This enables phosphate producers to return the tailings to the land at a much faster rate than possible heretofore.

While the invention has been described with reference to specific examples disclosed herein, these are to be regarded as illustrative rather than restrictive. The invention is not to be construed as limited to these particular examples.

What is claimed is:

1. A process for separating suspended solid clay particles from phosphate tailing slimes comprising:
   a. adding an amount of finely divided sand particles to the slimes such that the resulting slimes contain clay and sand in a ratio of about 1:1 by weight;
   b. forming a slurry by treating the resulting slimes with an anionic polyelectrolyte flocculating agent to bring about at least partial agglomeration of clay and sand particles;
   c. introducing the slurry as an influent feed into a seperation vessel beneath the upper boundary of a solids settling zone containing previously formed agglomerates of solid clay and sand particles at a concentration higher than the concentration in the influent feed;
   d. deflecting the path of the influent feed radially outwardly from the point of influent feed introduction through the settling zone without additional agitation, thereby effecting increased contact between clay and sand particles in the influent fee and agglomerated clay and sand particles in the settling zone, additional agglomeration of clay and sand particles within the settling zone, and the formation of clarified liquid in the upper portion of the separation vessel;
   e. continuously removing a relatively dense sludge containing agglomerated clay and sand particles from the settling zone at a rate which maintains the upper boundary of the settling zone substantially stationary; and
   f. continuously removing clarified liquid from the upper portion of the separation vessel.

2. A process in accordance with claim 1 wherein the anionic polyelectrolyte flocculating agent is a polyacrylamide resin.

3. A process in accordance with claim 1 wherein the anionic polyelectrolyte flocculating agent is added in an amount in the range from about 5 to 30 parts per million.

4. A process in accordance with claim 1 wherein the influent feed is introduced into the settling zone at a rate in the range from about 0.4 to 4.2 gallons per minute per square foot of cross-sectional area of settling zone.

5. A process in accordance with claim 1 wherein the sludge containing agglomerated clay and sand particles removed from the settling zone is deposited in a settling pond for dewatering and compaction.

* * * * *